US012397738B1

(12) United States Patent
Nelson et al.

(10) Patent No.: US 12,397,738 B1
(45) Date of Patent: Aug. 26, 2025

(54) NARROW-WIDTH AND/OR SIDE-MOUNTED DISK INFLATOR AIRBAG ASSEMBLIES

(71) Applicant: Autoliv ASP, Inc., Ogden, UT (US)

(72) Inventors: Ryan D. Nelson, Bear River City, UT (US); Kent D. Potter, Brigham City, UT (US); J D Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 18/584,883

(22) Filed: Feb. 22, 2024

(51) Int. Cl.
*B60R 21/26* (2011.01)
*B60R 21/217* (2011.01)

(52) U.S. Cl.
CPC ............ *B60R 21/26* (2013.01); *B60R 21/217* (2013.01); *B60R 2021/26041* (2013.01)

(58) Field of Classification Search
CPC ............................. B60R 21/217; B60R 21/26
See application file for complete search history.

(56) References Cited

U.S. PATENT DOCUMENTS

| 5,988,677 | A | * | 11/1999 | Adomeit | B60R 21/261 |
| | | | | | 280/736 |
| 6,109,649 | A | * | 8/2000 | Adomeit | B60R 21/233 |
| | | | | | 280/740 |
| 6,422,600 | B1 | * | 7/2002 | Crohn | B60R 21/26 |
| | | | | | 280/736 |
| 7,159,900 | B2 | | 1/2007 | Reiter et al. | |
| 2002/0171231 | A1 | * | 11/2002 | Takimoto | B60R 21/206 |
| | | | | | 280/730.1 |
| 2006/0255578 | A1 | * | 11/2006 | Choi | B60R 21/261 |
| | | | | | 280/740 |
| 2008/0007037 | A1 | * | 1/2008 | Sauer | B60R 21/206 |
| | | | | | 280/743.1 |
| 2020/0101933 | A1 | * | 4/2020 | Williams | B60R 21/26 |

OTHER PUBLICATIONS

PCT/US2025/016671, International Search Report and Written Opinion, dated Mar. 11, 2024, (8 pgs).

* cited by examiner

Primary Examiner — James A English
(74) Attorney, Agent, or Firm — Thayne and Davis LLC; Matthew D. Thayne (57) ABSTRACT

Airbag cushions and related assemblies configured to accept side-mounting of airbag inflators and/or otherwise accommodate narrowing of an airbag module width. In some embodiments, the assembly may comprise an inflator housing defining a plenum. An airbag cushion may be fluidly coupled with the plenum and/or inflator housing and may define a throat region. A disk inflator may be coupled to the housing in a side-mounted configuration such that inflation gases from the disk inflator are configured to enter the plenum and then be directed into the airbag cushion via the throat region.

18 Claims, 6 Drawing Sheets

NARROW-WIDTH AND/OR SIDE-MOUNTED DISK INFLATOR AIRBAG ASSEMBLIES

SUMMARY

Airbag modules and/or assemblies are disclosed herein having novel inflator housings and/or couplings, such as inflator housings providing a side-mounted configuration for a disk-style inflator.

Some airbag modules and/or assemblies, such as passenger airbag (PAB) module assemblies, may face certain space restraints, such as maximal width specifications. However, current disk type inflators have a width that makes satisfaction of these preferences and/or requirements difficult or impossible. For example, the width of such PAB inflators may be greater than the required or preferred width of the PAB module itself.

Although use of other inflators, such as tubular inflators, may accommodate such width/space preferences, such inflators are typically more expensive, particularly if new inflator shapes and/or styles are needed.

The present inventors have therefore determined that it would be desirable to provide apparatus, systems, and methods that overcome one or more of the foregoing limitations and/or other limitations of the prior art. In some embodiments, the inventive concepts disclosed herein may therefore allow for use of known inflators, such as disk type inflators, within airbag modules having a particular dimensional restriction and/or requirement, such as a maximal width preference and/or requirement.

In some embodiments, this may be achieved by mounting such inflators in a side-mounted configuration within the module, or within an inflator module that may be coupled with and/or otherwise be part of an airbag module/assembly. In other words, the "height" of the inflator, which may be less than its width and may be typically oriented along a longitudinal axis of the module/assembly, may instead be positioned to extend along the "width" of the module/assembly, such that, for example, in some cases the maximal dimension of the inflator (the "width") extends along the maximal dimension of the module/assembly (the "height"), thereby maximizing space and allowing for creation of a new module/assembly having a lesser smallest dimension (again, the width) without requiring the development and/or use of novel and/or more expensive inflators.

However, it should be understood that the use of novel inflators rather than existing inflators and/or disk type inflators does not preclude the possibility of use of the inventive concepts disclosed herein. Indeed, due to the novel inflator module configurations disclosed herein, it is contemplated that those of ordinary skill in the art may be able to use new inflators and/or other inflator types to provide a narrower airbag assembly configuration.

For example, it is contemplated that some non-disk type inflators that are configured with an uneven height-width ratio may be side-mounted or otherwise used in conjunction with the inflator modules and/or diffusion chambers/features disclosed herein. Similarly, it is contemplated that novel inflators, whether disk type or non-disk type, may be developed in the future that may be used in conjunction with the inflator modules and/or diffusion chambers/features disclosed herein.

Some embodiments provided herein may, in addition to or as an alternative to the aforementioned space saving benefits, provide other benefits, such as reduction in cushion materials used, reduction in or elimination of heat shielding components (since features in the inflator housing discussed herein may be used to redirect inflation gases and for heat shielding), and/or reduction in or elimination of fabric diffuser elements.

In a more particular example of an airbag cushion assembly according to some embodiments, the airbag cushion assembly may comprise an inflator housing defining a plenum. In some cases, the inflator housing may also comprise or be considered part of the airbag housing. Alternatively, the inflator housing may be considered a separate component that may be coupled with an airbag housing to comprise a more complete airbag assembly and/or module. The assembly may further comprise an airbag cushion fluidly coupled with the inflator housing, which airbag cushion may comprise a throat region. An inflator, such as a disk inflator, may be coupled to the housing in a side-mounted configuration such that inflation gases from the inflator are configured to enter the plenum and then be directed into the airbag cushion via the throat region.

In some embodiments, the inflator may comprise a height and a width extending in a direction perpendicular to the height, with the width being greater than the height. The inflator may then be configured to deliver inflation gases in a direction corresponding with, or parallel to, the width. In some cases, the inflator may be configured to also, at least in part, deliver inflation gases in a direction perpendicular to both the height and the width of the inflator. However, in some cases, such as certain circular disk inflators, the width of the inflator may be the same about a full perimeter of the inflator, with only the height being perpendicular thereto.

In some embodiments, the plenum may comprise a width, which in some cases may be a maximal width of the plenum and/or the corresponding housing and/or airbag module. The inflator housing may be configured to be installed in a vehicle with the width of the plenum extending along a front-to-back direction of the vehicle. The inflator may be coupled with the housing such that the height of the housing is parallel, or at least substantially parallel, with the width of the inflator.

In some embodiments, the plenum may comprise a lower chamber and an upper chamber in fluid communication with the lower chamber. In some such embodiments, the inflator may be mounted to the inflator housing in the lower chamber.

In some embodiments, the lower chamber may comprise a circular-shaped slot configured to receive the disk inflator. In some such embodiments, a portion of the disk inflator may be configured to protrude from the circular-shaped slot following mounting of the inflator housing to the circular-shaped slot. Similarly, in some embodiments, a portion of the disk inflator opposite the aforementioned portion may protrude from the opposite end of the slot and into a protruding basin.

In some embodiments, the inflator housing may be configured to prevent inflation gases from the inflator from directly passing from the lower chamber to the upper chamber. In some embodiments, the inflator housing may be configured to prevent inflation gases from the disk inflator from directly passing into the airbag cushion without first being deflected and/or cooled by components of the inflator housing.

Some embodiments may further comprise a pair of deflection tunnels fluidly coupling the lower chamber with the upper chamber and/or a barrier, such as a deflection plate, positioned between the pair of deflection tunnels. The barrier may be configured to redirect some of the inflation gases from the inflator towards the deflection tunnels.

In an example of an airbag cushion module according to some embodiments, the module may comprise a housing comprising a diffusion chamber. The housing may comprise a width, and the housing may be configured to be installed in a vehicle with the width extending along a front-to-back direction of the vehicle. An inflator may be coupled with the housing, which inflator may comprise a height and a width. The inflator may be configured to deliver inflation gases in a direction corresponding with the width, with the width being greater than the height. The inflator may be coupled with the housing such that the height of the housing is at least substantially parallel and/or aligned with the width of the inflator. An inflatable cushion may be fluidly coupled with the housing.

In some embodiments, the inflator may comprise an inflator having a larger width than its height and/or an inflator having a constant width extending about a full perimeter of the inflator, such as a disk inflator. In some such embodiments, the disk inflator may comprise a plurality of inflator ports extending about a perimeter of an upper end of the disk inflator. In some such embodiments, the upper end of the disk inflator may extend through a slot formed in the housing. In some such embodiments, the housing may further comprise a lower chamber. In some cases, the slot may be formed in the lower chamber. In some cases, a lower end of the inflator may protrude from the lower chamber.

In another specific example of an airbag cushion assembly according to some embodiments, the assembly may comprise an inflator housing comprising an upper chamber and a lower chamber. An inflator, such as a disk inflator, may be mounted to the lower chamber and fluidly coupled with the upper chamber. An inflatable cushion may be coupled with the upper chamber and may be configured to receive inflation gas from the inflator.

In some such embodiments, the inflator may be coupled to the lower chamber in a side-mounted configuration. In some such embodiments, the inflator may comprise a height and a width extending perpendicular to the height. The inflator height may be less than the width. The inflator may be coupled to the lower chamber with an upper end of the inflator extending into a slot formed in the lower chamber such that the height of the inflator extends along a direction into which the inflator is configured to extend during a step of coupling the inflator to the inflator housing.

In some such embodiments, the lower chamber may be fluidly coupled with the upper chamber so as to avoid any inflation gases from the disk inflator directly entering the upper chamber. In some such embodiments, the lower chamber may be fluidly coupled with the upper chamber via a pair of deflection tunnels. Some such embodiments may further comprise a barrier/deflection plate positioned between the pair of deflection tunnels. The barrier may be configured to redirect some of the inflation gases from the inflator towards the deflection tunnels.

Some embodiments may further comprise a retainer ring. In some cases, the barrier may be an integral portion of the retainer ring. In some cases, the retainer ring may also be used to secure the airbag cushion to the inflator housing.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
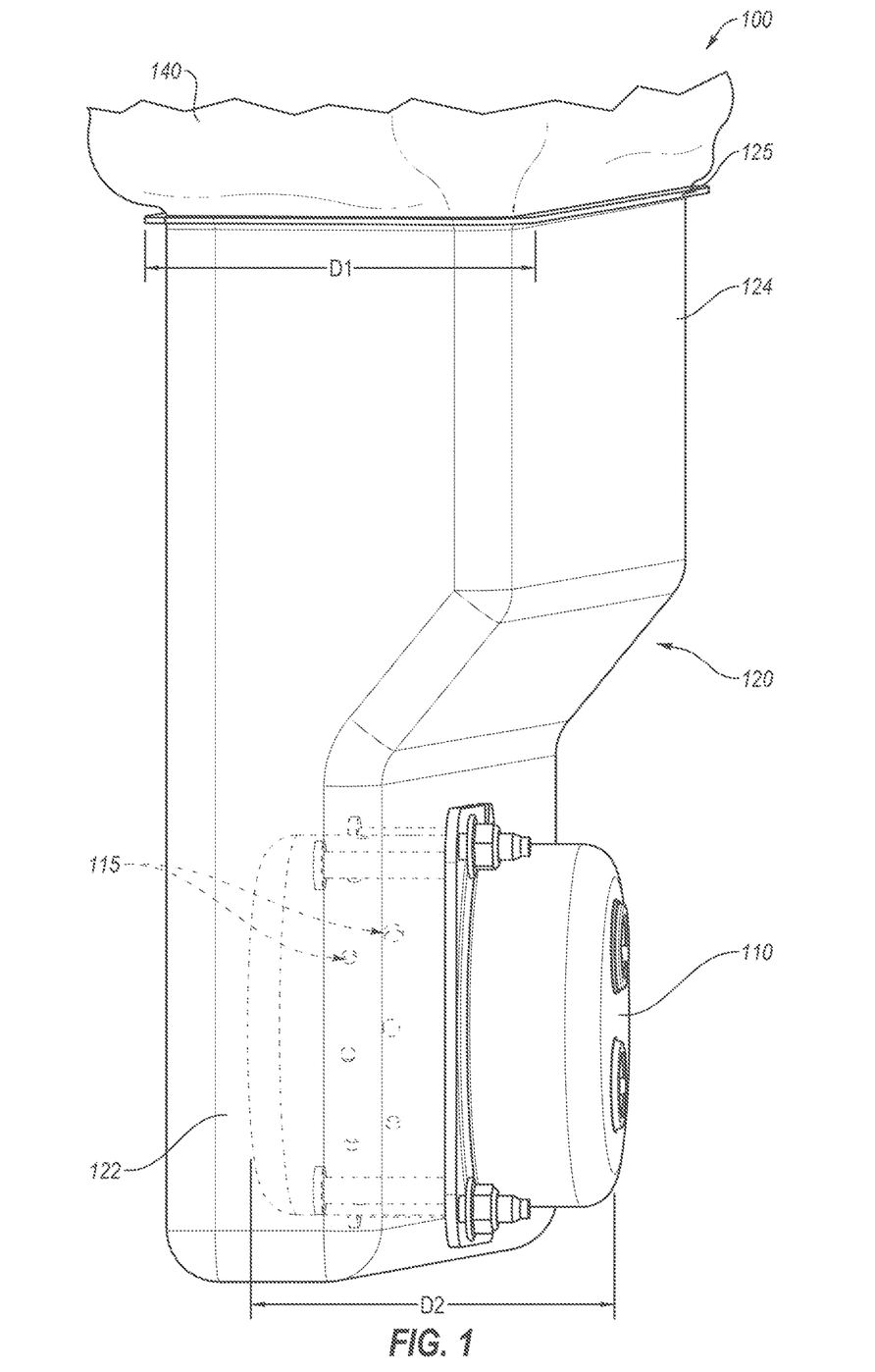
FIG. 1 is an isometric view of an airbag module having a side-mounted inflator according to some embodiments.

FIG. 1 depicts an airbag cushion assembly 100 according to some embodiments. Airbag cushion assembly 100 comprises an inflator 110 coupled with a disk type inflator 110. In some preferred embodiments, assembly 100 may comprise a passenger airbag assembly, which may be configured, for example, to deploy from a dashboard of a vehicle.

Inflator 110, which may comprise a known, disk-type inflator, is shown mounted to a housing or module 120. However, in preferred embodiments, inflator 110 may be positioned in the assembly 100 in a novel configuration and using a novel housing 120. In particular, as shown in FIG. 1, inflator 110 is shown mounted to housing 120 in a side-mounted configuration. That is, inflator 110 has been rotated on its side such that the inflation ports 115, which in the depicted embodiment extend about a full perimeter of inflator 110 along an upper portion of inflator 110, are positioned in an unconventional manner relative to the housing 120. Indeed, the upper portion of the inflator 110 is positioned within housing 120, a lower portion of the inflator 110 protrudes from a side of housing 120, and the inflation ports 115 extend about a perimeter of the inflator 110 relative to the housing 120 such that some ports extend directly towards cushion 140, others extend towards a bottom wall of the housing 120, and still others towards opposing side walls of housing 120.

However, it is contemplated that other types of inflators may be used in alternative embodiments. Still, for purposes of this disclosure, it should be understood that the "height" of the inflators discussed herein should, unless otherwise stated, be considered less than their "width" such that positioning of the inflator along its side with its "height" extending perpendicular to an elongated direction of the airbag module and/or perpendicular to the primary direction of deployment of the associated airbag cushion positions the inflator with its largest dimension or "width" extending along the aforementioned elongated direction and/or primary deployment direction. Again, this direction typically corresponds with the direction of at least some of the inflation ports in a typical disk style inflator, but this need not be the case for all contemplated embodiments.

Housing 120 is also formed with an enlarged upper portion 124, a narrowed lower portion 122, and a transitional region therebetween in which the width of the housing 120 transitions between the narrow and wider/enlarged portion of the housing 120. The lower portion 122 of housing 120 is, in the depicted embodiment, less wide than the height D2 of the inflator 110 positioned on its side and therefore the bottom of inflator 110 protrudes from the side of narrowed portion 122 of housing 120. However, the width D1 (measured in the same direction as the height of the inflator 110) of the upper portion 124 may be the same as, at least substantially the same as, or only slightly greater than, the height D2 of the inflator 110.

In other words, in some embodiments, D1 may be at least substantially equal to D2. However, it should be understood that "substantially equal" may allow for some flexibility. For example, the rim 125 of housing 120 may be slightly wider than the height D2 of inflator 110.

Rim 125 of housing 120 may be used to mount the assembly 100 within a vehicle or, in some embodiments, to an extended housing portion (not shown) that may house the airbag cushion 140. In other words, it is contemplated that housing 120 may be used to enclose the entire airbag cushion 140 in some cases or may be coupled with another housing or housing part that is used to store the cushion 140 in other cases. Thus, it is contemplated that the upper/enlarged portion 124 of housing 120 may be used to store the cushion 140 prior to deployment or, alternatively, may be used to diffuse inflation gases that may then enter another portion of the housing/assembly thereafter. For example, in some embodiments, upper portion 124 may be used to deflect and/or cool inflation gases prior to entering the cushion 140.

Because of the standard width of typical disk-type inflators, which are typically equal to or greater than about 100 mm in width, it may be difficult to manufacture airbag modules/assemblies having a narrower width. For example, it may be desired to provide a module/assembly, particularly for certain passenger airbag modules/assemblies, which has a width (measured in a front to back direction of the vehicle) that is less than about 90 mm (measured in the direction of D1), or even more preferably less than or equal to about 85 mm. In some embodiments, the width of the entire module (again, as measured in the direction of D1 and/or in the direction of front to back of the vehicle) may be even less, such as less than or equal to about 75 mm, or even less than or equal to about 65 mm in other embodiments, depending upon the specific inflator used.

Thus, by installing inflator 110 in the depicted, side-mounted configuration, disk-type inflators, known and/or standard disk-type inflators may be used in connection with novel, narrower housings/modules, as disclosed herein, without requiring development of new inflators and/or use of other inflator types, such as tubular inflators.

Figure 2A:
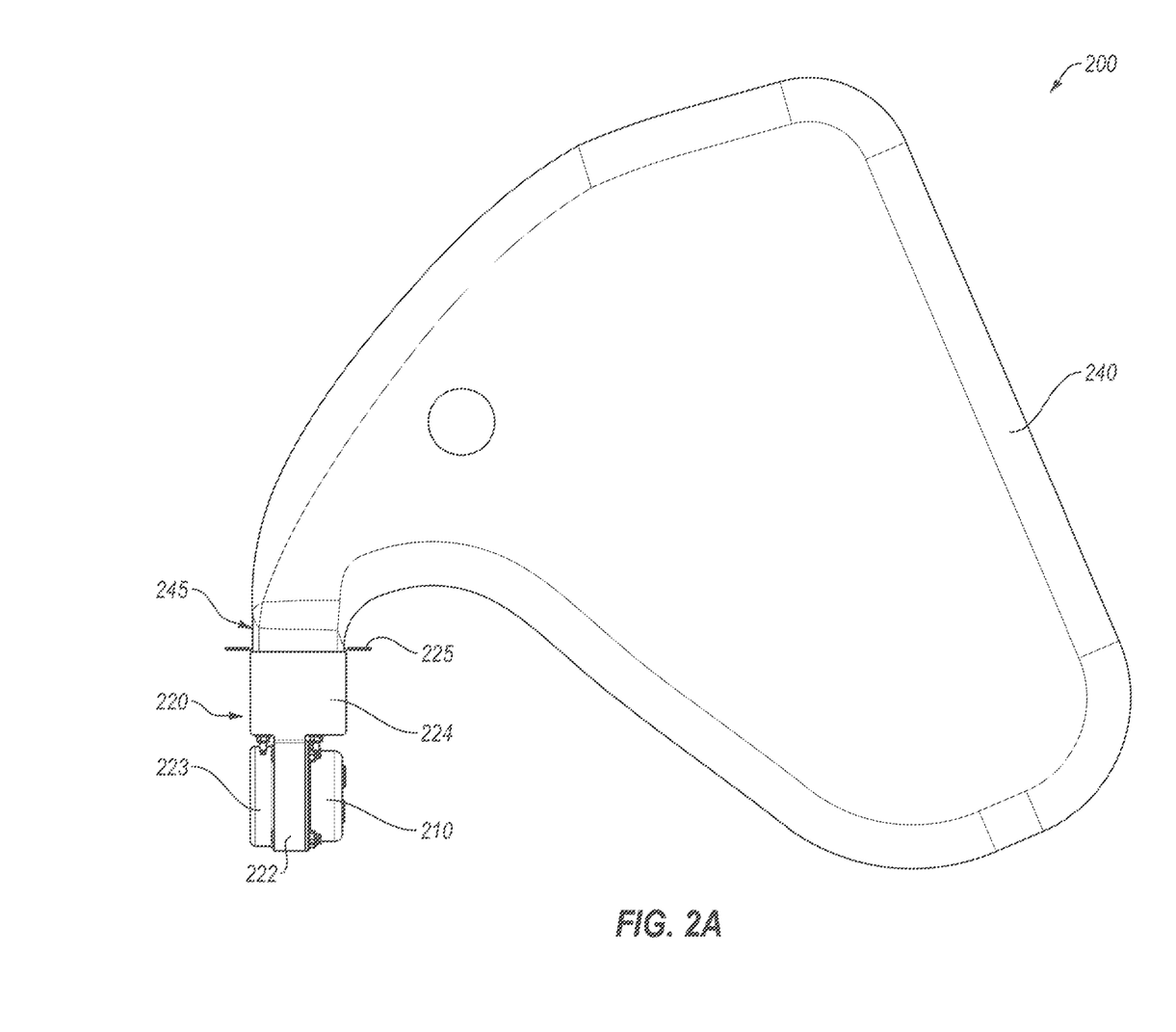
FIG. 2A is an elevation view of another airbag module according to other embodiments, shown following deployment.
Figure 2B:
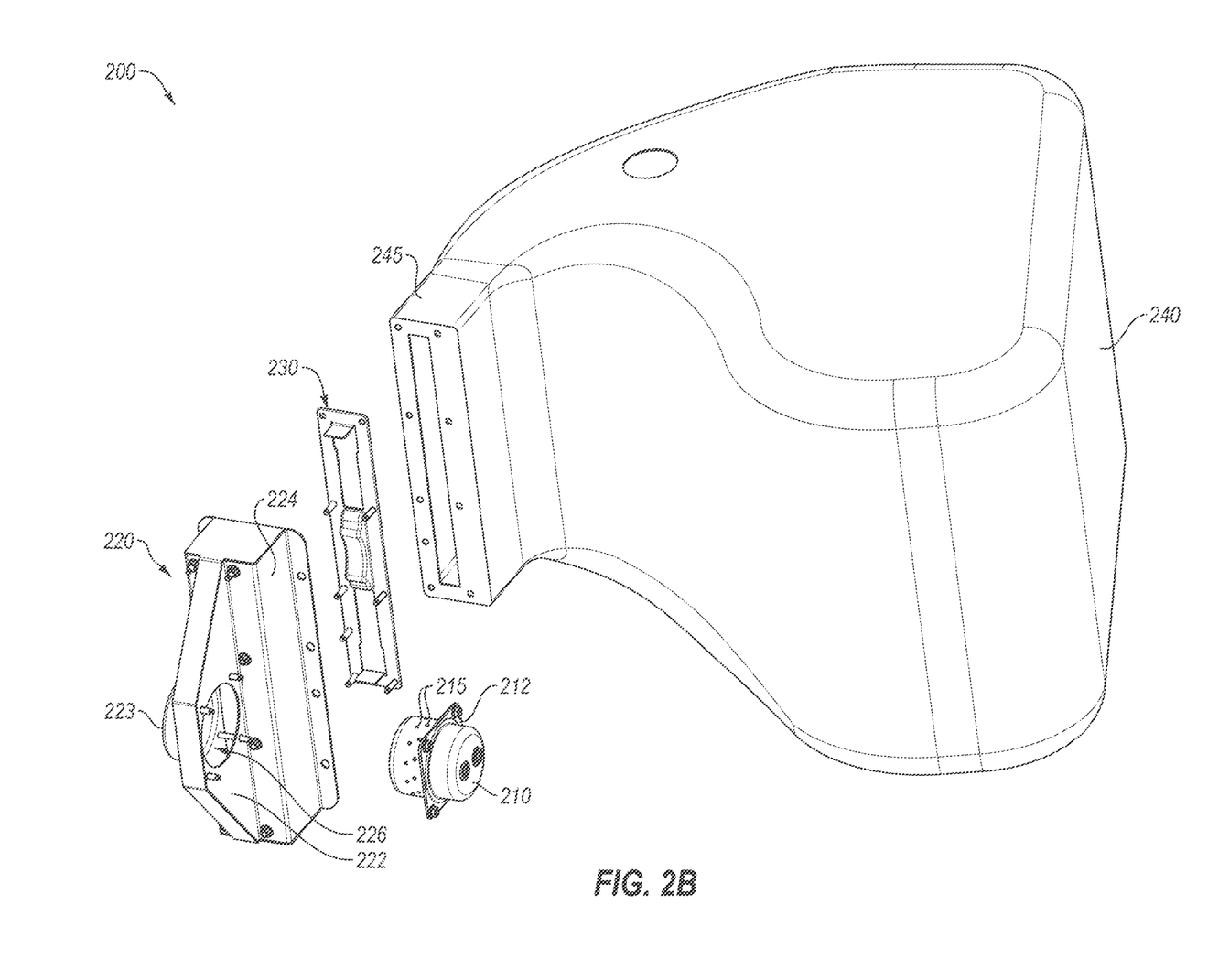
FIG. 2B is an exploded view of the airbag module of FIG. 2A.
Figure 2C:
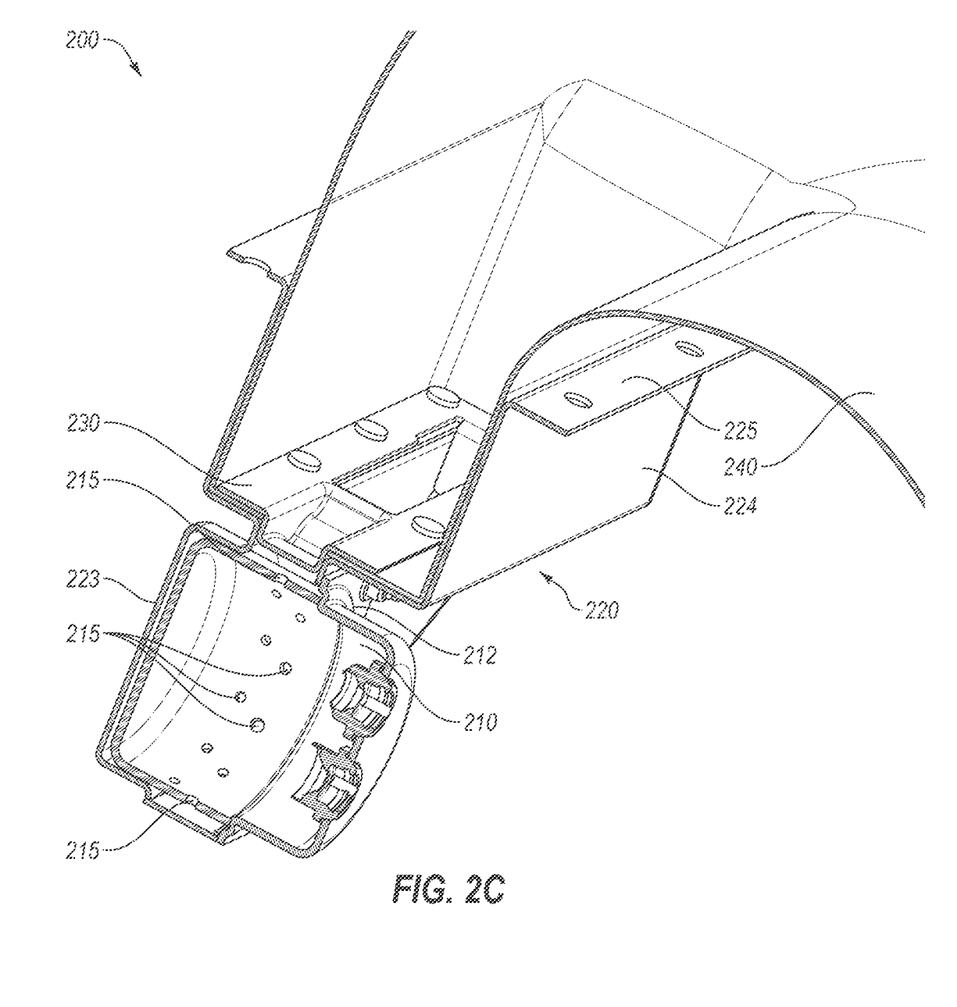
FIG. 2C is a cross-sectional view of the airbag module of FIGS. 2A and 2B.

FIGS. 2A-2C depict another airbag cushion assembly 200 according to other embodiments. As shown in FIG. 2A, which depicts assembly 200 following deployment, assembly 200 again comprises an inflator, a housing/module 220, and an airbag cushion 240. Inflator 210 may, once again, comprise a typical, disk-type inflator that is coupled with housing 220 in a side-oriented and/or side-mounted configuration.

Housing 220 comprises an upper portion 224 and a lower portion 222. In this embodiment, lower portion 222 comprises a circular slot 226 (see FIG. 2B) within which inflator 210 may be mounted. Lower portion 222 further comprises a protruding basin 223 such that inflator 210 can be mounted to lower portion 222 with the upper portion of the inflator 210 (the portion with ports 215) inserted into the protruding basin 223 and the lower portion of the inflator 210 protruding from the opposite end of the basin 223 uncovered. Inflator 210 may be mounted within this slot 226 and basin 223 by use of bolts or other fasteners that may be coupled with a skirt 212 or other rim and/or coupling feature of inflator 210.

Lower portion 222 of housing 220 may therefore comprise a narrowed rim portion with opposing sides that taper from the upper portion 224 of housing 220 to provide for gas distribution and/or diffusion into upper portion 224, as discussed in greater detail below.

As also shown in FIG. 2B, housing 220 may further comprise a retainer ring 230 that may be coupled within a lower end of upper portion 224 of housing 220. The functionality of this retainer ring 230 will also be discussed in greater detail below, but may be used, at least in part, to secure a throat region 245 of cushion 240 to the upper portion 224 of housing 220, as better shown in the cross-sectional view of FIG. 2C.

As also shown in FIG. 2C, the retainer ring 230 may be mounted at a lower end of upper portion 224 of housing 220. In addition, cushion 240 along throat region 245 may be mounted, at least partially, underneath retainer ring 230. The upper end of upper portion 224 of housing 220 may comprise a protruding rim 225 to facilitate mounting of the assembly 200 within a vehicle. As used herein, the various chambers defined by housing 220, including the upper chamber of upper portion 224 and the lower chamber of lower portion 222, that ultimately diffuse, cool, and/or deliver inflation gases into cushion 240 may collectively be considered a "plenum."

Figure 3:
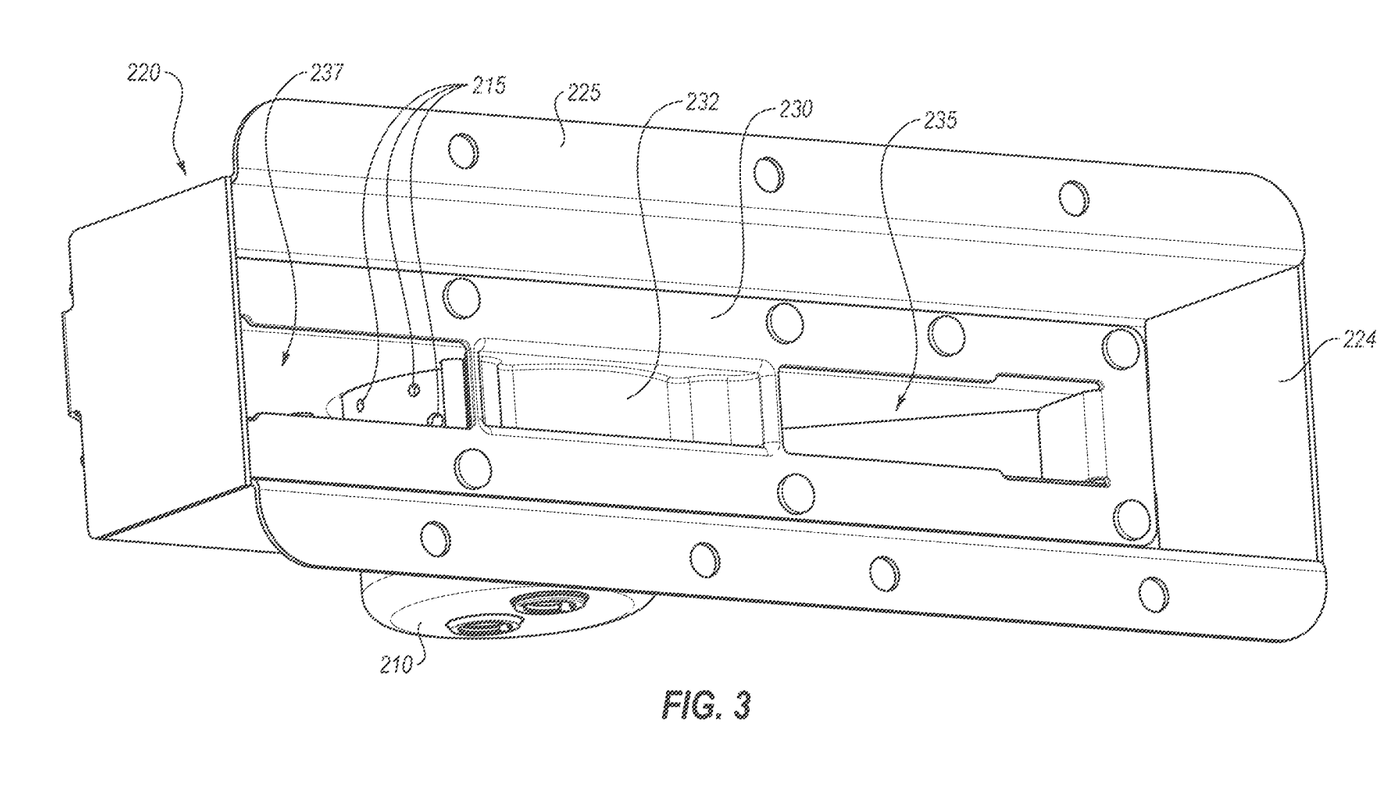
FIG. 3 is an isometric view depicting the interior of the inflator housing of the airbag module of FIGS. 2A-3.

FIG. 3 is a perspective view depicting the inside of housing 220. As shown in this figure, the lower portion 222 of housing 220 comprises a pair of opposing, ramped diffusion chambers 235/237 that may be used to direct inflation gases from inflator ports 215 of inflator 210 into an upper chamber defined by upper portion 224 of housing 220. Diffusion chambers 235/237 are configured to redirect inflation gases, which may involve deflecting and cooling the inflation gases, from inflator 210.

Although one of the ramped diffusion chambers, namely, ramped diffusion chamber 235, is visible in FIG. 3, the shapes of the diffusion chambers 235/237 of lower portion 222 of housing 220 are better appreciated from the outside in the view of FIG. 2B. As shown in this figure, each chamber extends partially below the slot 226 along a flattened bottom shelf of lower portion 222. In addition, each of the diffusion chambers 235/237 is narrower than the width (measured along the direction of the height of the inflator 210, which, again, is positioned along its side within slot 226) of the upper portion 224 of housing 220, thereby resulting in the bottom of inflator 210 protruding from slot 226 and the upper portion being encased within basin 223.

Because inflation ports 215 extend about a full perimeter of an upper portion of inflator 210, ramped chambers 235/237 may therefore extend below inflator ports 215 at the bottom end of the housing 220, as best seen in FIG. 2C, along the aforementioned bottom shelf of lower portion 222 in order to redirect the downwardly directed inflation gas. In addition, to prevent inflation gases from directly entering the upper chamber defined by upper portion 224 of housing 220, a deflection plate 232 may be provided in between the two openings leading to diffusion and/or deflection chambers 235/237 in the opposite direction vis-à-vis the direction of the aforementioned bottom shelf of lower portion 222. Deflection plate 232, which may be integrally part of retainer ring 230 in some embodiments or may be coupleable thereto in other embodiments, may be positioned centrally above inflator 210 such that inflation gases from the inflator ports 215 that are positioned thereabove are deflected into the opposing, ramped chambers 235/237. Similarly, inflation gases from inflator ports 215 adjacent to the bottom shelf may also be directed to the opposing, ramped chambers 235/237 for delivery into upper portion 224 and, ultimately, into the airbag cushion.

As can be seen in FIGS. 2A-2C and FIG. 3, assembly 200 is configured to avoid any inflation gases, or at least substantially any inflation gases, from inflator 210 directly entering airbag cushion 240. In some embodiments, including assembly 200, the inflator and/or inflator housing may be configured to avoid any inflation gases, or at least substantially any inflation gases, from the inflator directly entering a chamber immediately adjacent to the airbag cushion. For example, in the depicted embodiment, inflator housing 220 comprises two portions and/or chambers-namely, respective chambers defined within upper portion 224 and lower portion 222, the chamber in lower portion 224 of which is configured with various features and/or components for deflecting inflation gases before they are allowed to enter the chamber defined within upper portion 224, as previously discussed, such as deflection plate 232 and deflection chambers 235/237.

Figure 4:
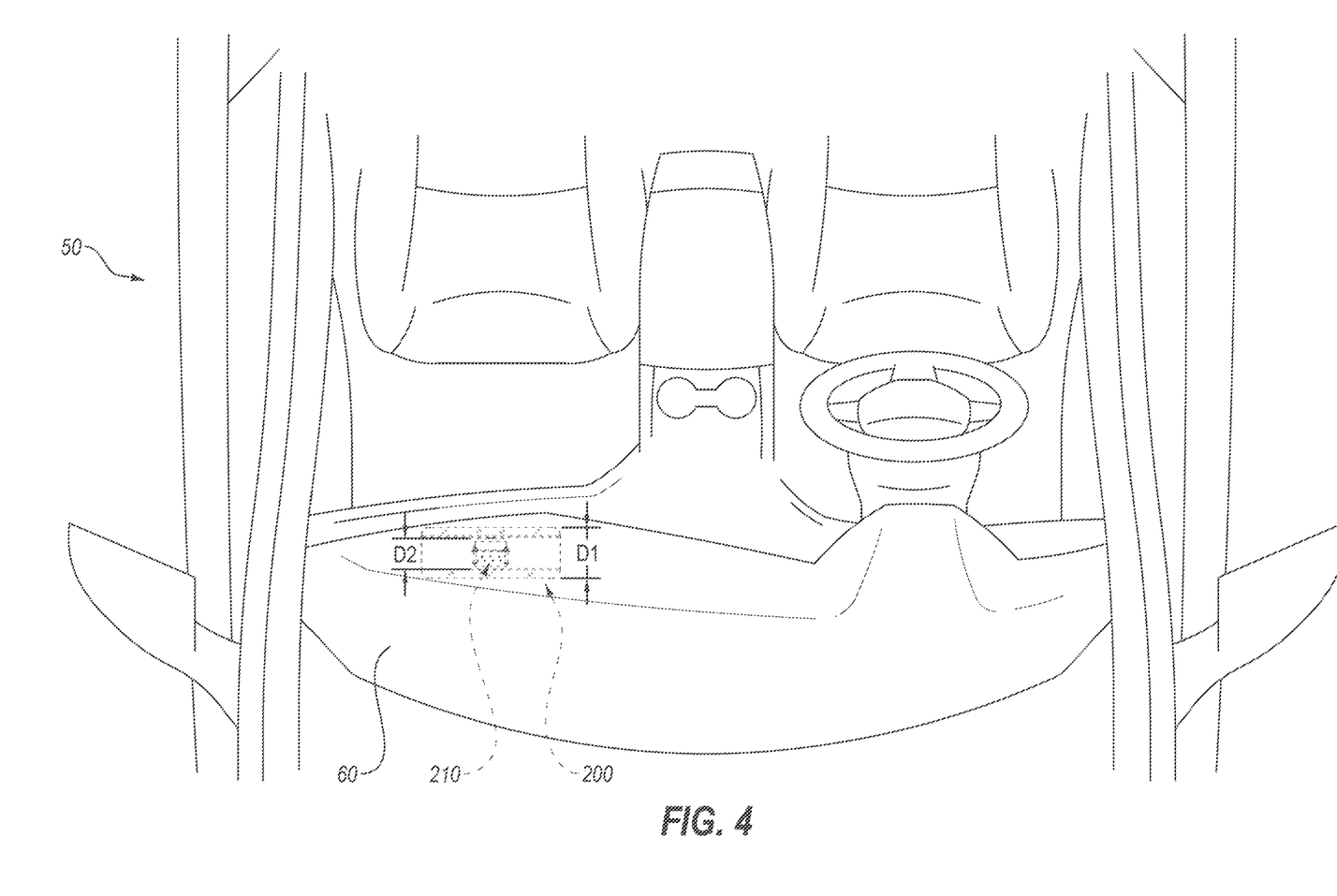
FIG. 4 is an overhead view of a vehicle with an airbag module mounted in the passenger dashboard.

FIG. 4 illustrates a vehicle 50 with airbag assembly 200 positioned therein prior to deployment. Airbag assembly 200 is positioned in the passenger dashboard 60 of vehicle 50 and therefore is considered a passenger airbag assembly or module. As previously mentioned, module 200 is positioned within vehicle 50 with its inflator 210 positioned in a side-mounted configuration. In other words, the height D2 of the inflator—which is measured in a direction perpendicular, or at least substantially perpendicular, in the depicted embodiment to the direction with which the inflation ports direct inflation gases about a perimeter of the inflator 210—extends in a front-to-rear direction of the vehicle 50, as shown in FIG. 4.

As previously mentioned, by mounting the inflator 210 on its side in this manner, disk-type inflators may be used in passenger airbag modules, or other modules that may benefit from placement in relatively narrow locations. Thus, in some embodiments, airbag modules may be configured with a width D1 that is about the same or only slightly greater than the height D2 of the inflator that is used in the module/assembly. In some cases, this width may be the maximum width of the assembly, given, for example, that some modules may have narrower portions along the width direction (consider lower portion 222 of assembly 200, for example).

For example, in some embodiments, the width D1 of the module may be less than or equal to about 85 mm or, even more preferably, less than or equal to about 70 mm, or in some such embodiments less than or equal to about 65 mm, or even less than or equal to about 60 mm in some embodiments. In one or more of the foregoing examples, the disk inflator used, such as an APPS4.5 inflator, may have a height (again, measured in the direction of D2) of about 60 mm.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:
1. An airbag cushion assembly, comprising:
an inflator housing defining a plenum;

an airbag cushion fluidly coupled with the inflator housing, the airbag cushion comprising a throat region;

a disk inflator coupled to the housing in a side-mounted configuration such that inflation gases from the disk inflator are configured to enter the plenum and then be directed into the airbag cushion via the throat region, wherein the plenum comprises a lower chamber and an upper chamber in fluid communication with the lower chamber, and wherein the upper chamber is positioned entirely above the lower chamber.

2. The airbag cushion assembly of claim 1, wherein the disk inflator comprises a height and a width extending in a direction perpendicular to the height, wherein the disk inflator is configured to deliver inflation gases in a direction corresponding with the width, and wherein the width is greater than the height.

3. The airbag cushion assembly of claim 2, wherein the plenum comprises a width, wherein the inflator housing is configured to be installed in a vehicle with the width of the plenum extending along a front-to-back direction of the vehicle, and wherein the inflator is coupled with the housing such that the height of the housing is at least substantially parallel with the width of the inflator.

4. The airbag cushion assembly of claim 3, wherein the disk inflator is mounted to the inflator housing in the lower chamber.

5. The airbag cushion assembly of claim 4, wherein the lower chamber comprises a circular-shaped slot configured to receive the disk inflator, and wherein a portion of the disk inflator is configured to protrude from the circular-shaped slot following mounting of the inflator housing to the circular-shaped slot.

6. The airbag cushion assembly of claim 1, wherein the inflator housing is configured to prevent inflation gases from passing directly from the disk inflator and into the upper chamber.

7. The airbag cushion assembly of claim 6, further comprising:

a pair of deflection tunnels fluidly coupling the lower chamber with the upper chamber; and a barrier positioned between the pair of deflection tunnels, wherein the barrier is configured to redirect some of the inflation gases from the disk inflator towards the deflection tunnels.

8. An airbag cushion module, comprising:

a housing comprising a diffusion chamber, wherein the housing comprises a width, and wherein the housing is configured to be installed in a vehicle with the width extending along a front-to-back direction of the vehicle;

an inflator coupled with the housing, wherein the inflator comprises a height and a width, wherein the inflator is configured to deliver inflation gases in a direction corresponding with the width, wherein the width is greater than the height, and wherein the inflator is coupled with the housing such that the height of the housing is at least substantially parallel with the width of the inflator, wherein the inflator comprises a plurality of inflator ports extending about a perimeter of an upper end of the inflator, wherein the upper end of the inflator extends through a slot formed in the housing, wherein the diffusion chamber comprises an upper chamber and a lower chamber, and wherein the slot is formed in the lower chamber; and an inflatable cushion fluidly coupled with the housing.

9. The airbag cushion module of claim 8, wherein the inflator comprises a disk inflator.

10. The airbag cushion module of claim 8, wherein a lower end of the disk inflator protrudes from the lower chamber.

11. An airbag cushion assembly, comprising:

an inflator housing comprising an upper chamber and a lower chamber;

a disk inflator mounted to the lower chamber and fluidly coupled with the upper chamber such that inflation gas exits the disk inflator laterally of the disk inflator, within and into the lower chamber, and at a same height as the disk inflator, the height extending along a direction between the lower chamber and the upper chamber; and an inflatable cushion coupled with the upper chamber and configured to receive inflation gas from the disk inflator.

12. The airbag cushion assembly of claim 11, wherein the disk inflator is coupled to the lower chamber in a side-mounted configuration.

13. The airbag cushion assembly of claim 12, wherein the disk inflator comprises a height and a width extending perpendicular to the height, and wherein the disk inflator is coupled to the lower chamber with an upper end of the disk inflator extending into a slot formed in the lower chamber such that the height of the disk inflator extends along a direction into which the disk inflator is configured to extend during a step of coupling the disk inflator to the inflator housing.

14. The airbag cushion assembly of claim 11, wherein the lower chamber is fluidly coupled with the upper chamber so as to avoid any inflation gases from the disk inflator directly entering the upper chamber.

15. The airbag cushion assembly of claim 14, wherein the lower chamber is fluidly coupled with the upper chamber via a pair of deflection tunnels.

16. The airbag cushion assembly of claim 15, further comprising a deflection plate positioned between the pair of deflection tunnels, wherein the deflection plate is configured to redirect some of the inflation gases from the disk inflator towards the deflection tunnels.

17. The airbag cushion assembly of claim 16, further comprising a retainer ring.

18. The airbag cushion assembly of claim 17, wherein the deflection plate is an integral portion of the retainer ring.

* * * * *